J. C. GIRARDIN.
Tension Pulley for Sewing Machines.

No. 54,715.

Patented May 15, 1866.

Witnesses:
Francis D. Pastorius.
Geo E. Scardent.

Inventor:
Julien C. Girardin

UNITED STATES PATENT OFFICE.

JULIEN C. GIRARDIN, OF PHILADELPHIA, PENNSYLVANIA.

IMPROVEMENT IN TENSION-PULLEYS FOR SEWING-MACHINES.

Specification forming part of Letters Patent No. 54,715, dated May 15, 1866.

*To all whom it may concern:*

Be it known that I, JULIEN C. GIRARDIN, of Bemont, Switzerland, now residing in the city of Philadelphia, in the county of Philadelphia and State of Pennsylvania, have invented an Improvement in Tension-Pulleys for Sewing-Machines; and I do hereby declare that the following is a full, clear, and exact description of the same, reference being had to the accompanying drawings and to the letters of reference marked thereon.

My invention consists in using screws for securing together the plates or sides which compose the tension-pulleys.

In order to enable others to make and use my invention, I will describe its construction and operation.

Figure 1:
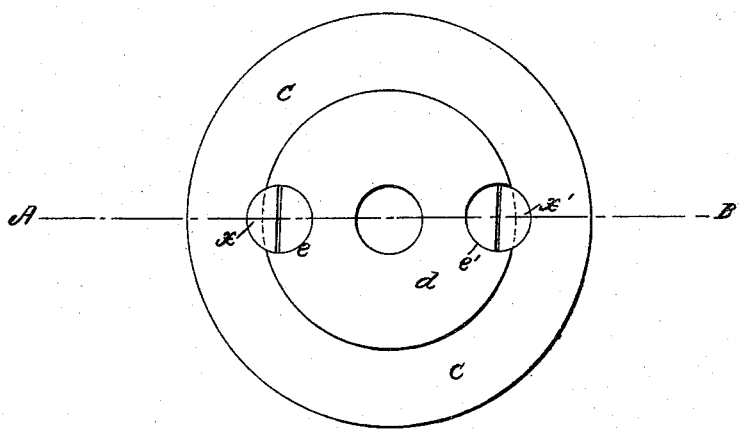
Figure 2:
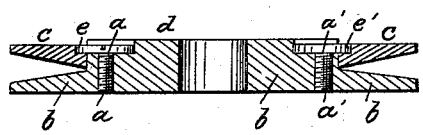

On reference to the accompanying drawings, which form part of this specification, Figure 1 is a plan view, and Fig. 2 is a section through the line A B.

Similar letters refer to similar parts in the two views.

A tension-pulley as now constructed consists of two circular plates, one of which has a hub fixed or formed to its inner side, which projects through a corresponding opening in the other. The inner side of each is beveled, that when they are riveted together a groove or circumferential opening is formed in their intersection. A pulley thus constructed has great objections, caused by fixing the plates together with rivets. In riveting, filings or burrs are liable to intervene, preventing the plates from being brought to the required closeness, dirt collects in the groove, the thread in passing round the pulley from the thread-guide is abraded and deposits fine light particles of cotton in the groove, filling it up and preventing the thread from packing in it, or from being pinched sufficiently to make the required tension, precluding the use of any but the coarsest thread.

To get the pulley in working order the plates must be forced apart, the dirt or foul matter removed, and then be riveted together again. It is necessary after each riveting to turn or smooth the surface of the plate and the face of the hub, which have been roughened in the process of riveting, to lessen the attrition between them and the washers. As the fouling is of frequent occurrence, it will be readily seen that a few rivetings destroys the pulley by cutting away its surface and hub in the several turnings or processes of smoothing.

I employ screws $a$ $a'$, (any number being used,) instead of rivets, for securing or fixing the plates $b$ and $c$ one to the other. They are screwed into the hub $d$ of the plate $b$, their heads $e$ $e'$ overlapping the plate $c$, keeping it firmly against the plate $b$. The face of the hub $d$ and the surface of the plate $c$ are countersunk to bring the heads of the screws even with the face of the plate $c$.

To obviate the necessity of removing the screws $a$ $a'$ to separate the plates $b$ and $c$, a segment, $x$ $x'$, of the overlapping portions of the heads of the screws is cut away, leaving the plate $c$ free to be disconnected from the plate $b$. When they are to be held together the screws are turned until the curved portion of the lune-shaped head of each overlaps the plate $c$.

To clear the pulleys, as heretofore made requires the service of a mechanic. Mine can readily be taken apart, cleaned, and put together by the sewing-machine operator, saving time and expense and the great cost of frequently renewing them.

What I claim as my invention, and desire to secure by Letters Patent, is—

The use of screws in place of rivets for fixing together the plates composing the tension-pulley of a sewing-machine, they having either ordinary heads, or the same with a segment cut away, for the purpose as herein specified and described.

In testimony whereof I hereunto sign my name to this specification in the presence of two subscribing witnesses.

JULIEN C. GIRARDIN.

Witnesses:
FRANCIS D. PASTORIUS,
W. W. DOUGHERTY.